(12) United States Patent
Kim et al.

(10) Patent No.: US 7,580,731 B2
(45) Date of Patent: Aug. 25, 2009

(54) APPARATUS AND METHOD FOR PROVIDING AN IMPROVED CHARACTER INPUT DISPLAY IN A MOBILE COMMUNICATION TERMINAL

(75) Inventors: Joon-Suh Kim, Anyang-si (KR); Chang-Soo Lee, Incheon (KR)

(73) Assignee: Samsung Electronics CO., LTD (KR)

( * ) Notice: Subject to any disclaimer, the term of this patent is extended or adjusted under 35 U.S.C. 154(b) by 582 days.

(21) Appl. No.: 11/221,128

(22) Filed: Sep. 7, 2005

(65) Prior Publication Data

US 2006/0111142 A1 May 25, 2006

(30) Foreign Application Priority Data

Nov. 24, 2004 (KR) ...................... 10-2004-0097133

(51) Int. Cl.
*H04B 1/38* (2006.01)
*H04M 1/00* (2006.01)

(52) U.S. Cl. .................. 455/566; 455/552.1; 455/556.1; 455/90.1

(58) Field of Classification Search ... 455/556.1–556.2, 455/566, 557, 550.1, 552.1, 90.1, 90.2; 345/173, 345/168

See application file for complete search history.

(56) References Cited

U.S. PATENT DOCUMENTS

| 6,073,036 | A | * | 6/2000 | Heikkinen et al. | ........ 455/550.1 |
| 6,522,347 | B1 | * | 2/2003 | Tsuji et al. | .................. 715/848 |
| 7,266,394 | B2 | * | 9/2007 | Carlson et al. | .............. 455/566 |
| 2004/0027312 | A1 | * | 2/2004 | Owada et al. | .................. 345/8 |
| 2007/0142035 | A1 | * | 6/2007 | Lee | .......................... 455/414.1 |

\* cited by examiner

*Primary Examiner*—John J Lee
(74) *Attorney, Agent, or Firm*—The Farrell Law Firm, LLP

(57) ABSTRACT

An apparatus and a method for providing improved character input displays in a mobile communication terminal. When the user inputs a first key, a first key number corresponding to the input key is displayed in an enlarged form on the display unit in the mobile communication terminal. Thereafter, if the user inputs a second key, then the second key number is displayed in the enlarged form of the preset magnification rate and the first key number is reduced to the original size on the display unit. The apparatus and the method enable user with poor vision to discern the last input key number from the preceding key numbers.

5 Claims, 4 Drawing Sheets

APPARATUS AND METHOD FOR PROVIDING AN IMPROVED CHARACTER INPUT DISPLAY IN A MOBILE COMMUNICATION TERMINAL

PRIORITY

This application claims priority to an application entitled "APPARATUS AND METHOD FOR PROVIDING IMPROVED DIALING NUMBER DISPLAY IN A MOBILE COMMUNICATION TERMINAL" filed in the Korean Industrial Property Office on Nov. 24, 2004 and assigned Ser. No. 2004-97133, the contents of which are hereby incorporated by reference.

BACKGROUND OF THE INVENTION

1. Field of the Invention

The present invention relates generally to a mobile communication terminal, more particularly to an apparatus and a method for displaying dialing numbers corresponding to input keys.

2. Description of the Related Art

Generally, in a conventional mobile communication terminal, when a user inputs specific number keys for calling, a display unit of the mobile communication terminal displays the numbers corresponding to the input keys. Further, the displayed numbers on the display unit can be adjusted in size in accordance with both the amount, i.e., how many, of the input numbers and the displayed area size. For example, when the user inputs the numbers to the extent of only two lines and to the extent of more than two lines currently displayed on the screen of the mobile communication terminal, the sizes of the numbers of the two cases are not identical.

FIGS. 1A, 1B and 1C illustrate exemplary display screens displayed on a display unit of a conventional mobile communication terminal. More specifically, FIGS. 1A and 1B illustrate input numbers being displayed on two lines of the display area of the mobile communication terminal, and FIG. 1C illustrates the input numbers being displayed on more than two lines. The screen of FIG. 1B provides more numbers per line using relatively smaller sized numbers, whereas the screen of FIG. 1A provides less numbers per a line using relatively bigger numbers. Further, in FIG. 1C, the characters (numbers) having a certain size are displayed in the form of three lines. However, if more than three lines of the characters having the same size as the certain size are input, then the character size automatically is reduced to receive more characters on the screen.

Such a conventional display scheme has a problem in that people who have poor vision cannot easily and distinctly discern input key characters (or numbers) displayed on the display unit of the mobile communication terminal. This is mainly because the input characters or numbers vary in size depending on the amount of the user input keys on the mobile communication terminal using the convention display scheme. For example, in the screen of FIG. 1A, even those having poor vision can easily discern the displayed input numbers, but in screen of FIG. 1B, the displayed numbers are reduced to a relatively smaller size, such that the people with poor vision cannot easily the view the displayed key numbers. Accordingly, like in FIG. 1C, character (or number) lines may be increased to receive more character data and constantly maintain the size of the displayed characters. In this case, however, the displayed character size is strictly restricted by a certain amount of input characters (numbers) per a screen page. For example, the displayed character size of FIG. 1C is smaller than that of FIG. 1A.

Furthermore, in the conventional method for displaying the telephone numbers in the mobile communication terminal, because there are a plurality of numbers displayed on one screen page, the last input number cannot be easily distinguished from the preceding serial input numbers. That is, when the user inputs and another number to the preceding string of numbers, the input last number is not distinguished from the others in size and shape, such that the user easily often re-inputs the same number as the last input number or does not input the number that the user really wants to input.

SUMMARY OF THE INVENTION

Accordingly, the present invention has been designed to solve the above and other problems occurring in the prior art. An object of the present invention is to provide an apparatus and a method for displaying input characters according to input keys wherein a last input character can be distinctly and easily distinguished from the preceding numbers previously input, and the amount of input characters does not depend on the size of the displayed characters using as large an area of the display unit as possible to present largely extended and displayed characters to the user.

In order to accomplish the above and other objects, according to one aspect of the present invention, there is provided an apparatus for providing an improved dialing number display in a mobile communication terminal. The apparatus includes: a controller for enlarging a first character corresponding to a first input key to an enlarged size by a preset magnification rate, and enlarging a second character corresponding to a second input key to the enlarged size by the preset magnification, while reducing the first character to an original size, which is relatively smaller than the enlarged size; and a display unit for displaying the second character and the first character.

According to another aspect of the present invention, there is provided a method for providing an improved dialing number display in a mobile communication terminal. The method includes the steps of: enlarging a first character corresponding to a key input to an enlarged size by a preset magnification rate; determining an input of a new key; reducing the enlarged first character to an original size, which is relatively smaller than the enlarged size; and enlarging a second character corresponding to the new key input to the enlarged size.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. A detailed description of known functions and configurations incorporated herein will be omitted when it may obscure the subject matter of the present invention.

The present invention, as will be described below, displays an input character (a first character), e.g., a letter or a number, which is enlarged by a preset magnification rate, on a display unit of a mobile communication terminal. Thereafter, if a next character is input, then the first input character is reduced in size and only the next input character is enlarged by the preset magnification rate, such that the display unit displays the last input character enlarged by the preset magnification rate and displays the previously input characters, e.g., the first number, at an original size by a preset reduction rate. Therefore, according to the present invention, the user can easily discern the last input character from the preceding characters.

Figure 1A:
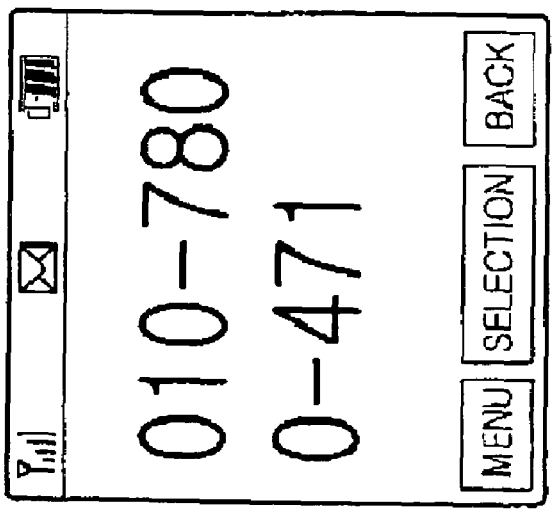
FIGS. 1A through 1C illustrate display screens of a conventional mobile communication terminal.
Figure 1B:
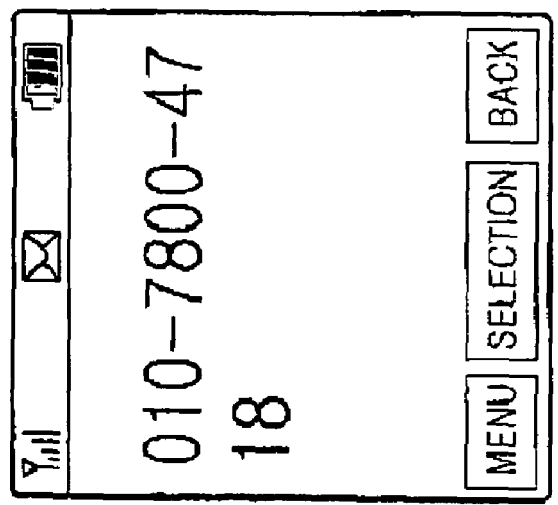
Figure 1C:
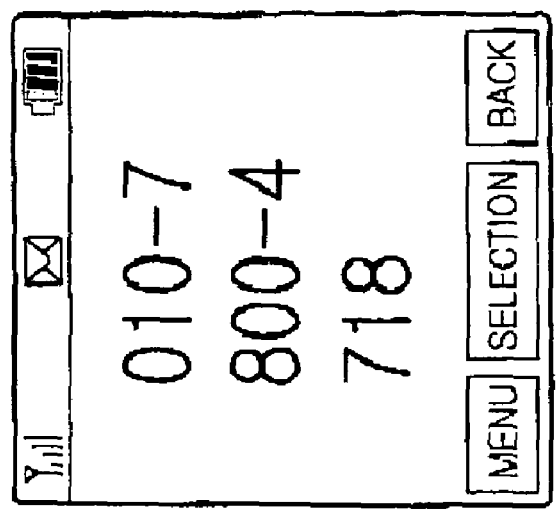
Figure 2:
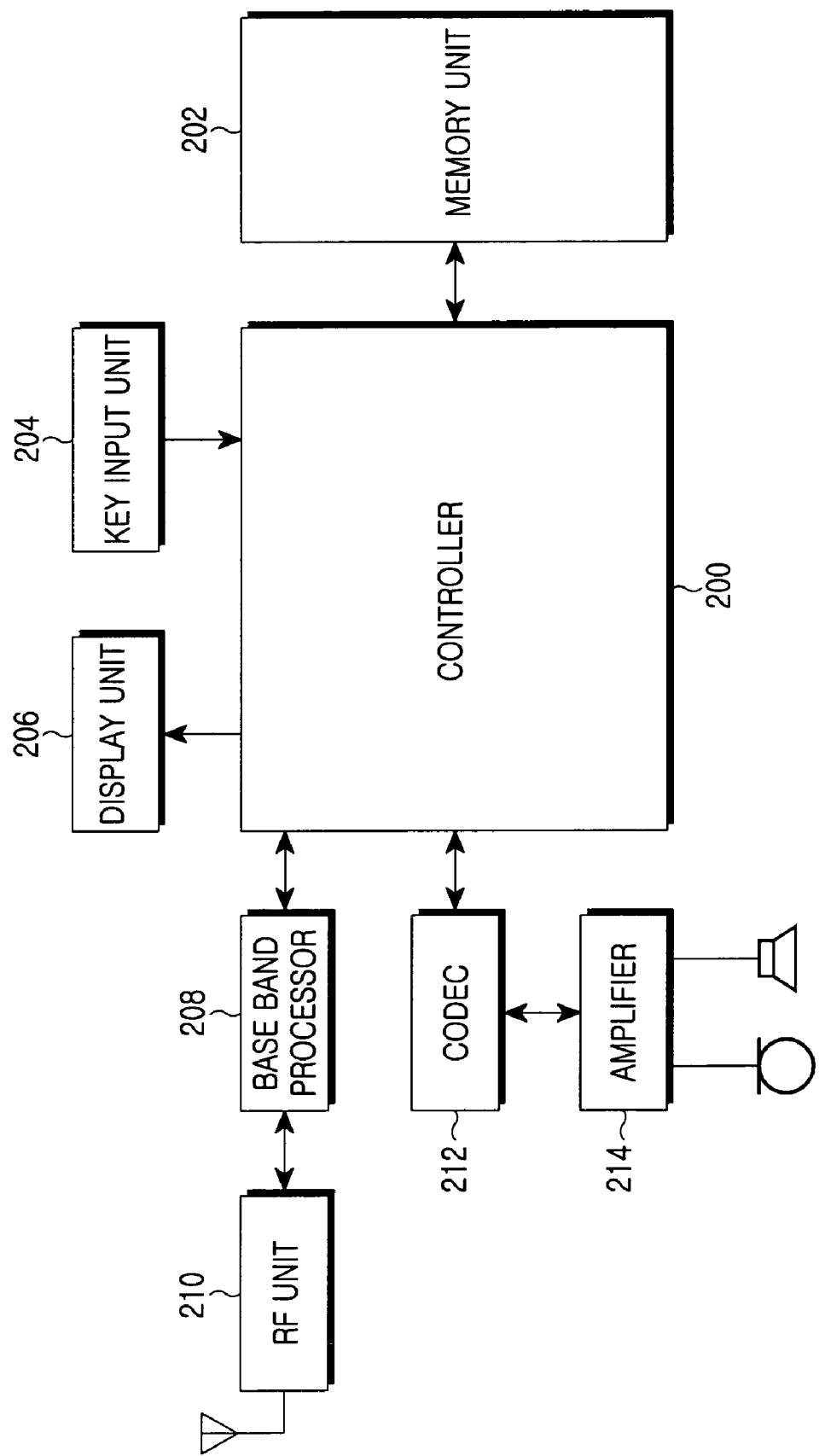
FIG. 2 illustrates a schematic block diagram of a mobile communication terminal according to a preferred embodiment of the present invention.

FIG. 2 illustrates a schematic block diagram of a mobile communication terminal according to a preferred embodiment of the present invention. Referring to FIG. 1, the mobile communication terminal according the present invention includes a memory unit 202, a key input unit 204, a display unit 206, a baseband processor 208, a Coder-Decoder (CODEC) 212, and a controller 200. The controller 200 is connected to all the elements mentioned above, that is, the memory unit 202, the key input unit 204, the display unit 206, the base band processor 208, and the CODEC 212. The controller 200 processes a voice signal and data based on protocols for accessing a phone call, data communication and a wireless Internet, and controls each part of the mobile communication terminal. Also, the controller 200 receives key input signals through the key input unit 204 and controls the display unit 108 to display character and image information based on the received user key input signals.

Herein below, the present invention will be described using input numbers as the type of characters displayed on a display of a mobile communication terminal by way of example. However, it should be noted that other types of character data, e.g., letters or symbols, could also be displayed according to the present invention.

According to an embodiment of the present invention, a first number (a first number) corresponding to a key input can be displayed on the display unit 206 in the form of an enlarged size by a preset magnification rate, which is maintained until a next number (second number) is input by the user. More specifically, if next number (second number) is input, then the first number is displayed in a relatively reduced size (e.g., an original size), and the second number is enlarged on the display unit by the preset magnification rate. Thereafter, if a third number is input, then the second number is reduced into the original size and the currently input third number is enlarged by the preset magnification rate. Therefore, the last number (e.g., the third number) can be always displayed in the enlarged size to the extent of the preset magnification rate.

The memory unit 202 connected to the controller 200 includes, for example, a read only memory (ROM), a flash memory, and a random access memory (RAM), etc. The ROM may store process and control programs that the controller 200 executes, and various reference data. The RAM provides working memory, and the flash memory provides an area for storing various save data that can be updated.

The key input unit 204 includes various keys including the number keys utilized above. The key input unit 204 receives the input key signals and relays the received key input signals to the controller 200.

An RF unit 210 receives and transmits RF signals from and to the base stations. Also, the RF unit 210 converts the received RF signals into intermediate frequencies (IF) signals, which then are output to the base band processor 208 connected with the controller 208. Further, the RF unit 210 receives the IF signals from the base band processor 208 and converts the received IF signals into the RF signals to transmit the converted RF signals to the outside, for example, the base station.

The baseband processor 208 is, for example, a baseband analog (BBA) ASIC for providing an interface between the controller 200 and the RF unit 210. The baseband processor 208 receives digital signals of the baseband from the controller 200 and converts the received digital signals to analog RF signals to be applied to the RF unit 210. Also, the baseband processor 208 receives the analog RF signals form the RF unit 210 and converts the received analog RF signals into the digital signals of the baseband to applied to the controller 200.

The CODEC 212 connected to the controller 200 is also connected to a microphone (MIC) and a speaker (SPK) via an amplifier 214. The CODEC 212 receives voice signals from the microphone and encodes the received voice signals into voice data using a pulse code modulation (PCM) scheme to be output to the controller 200. Also, the CODEC 212 receives the voice data and decodes the received voice data by the PCM scheme to output the decoded voice signals to the speaker via the amplifier 214. The amplifier 214 amplifies receives the voice signals from the microphone and amplifies the received voice signals to be sent to the speaker. The controller 200 controls volumes of the speaker and gains of the microphone.

Figure 3:
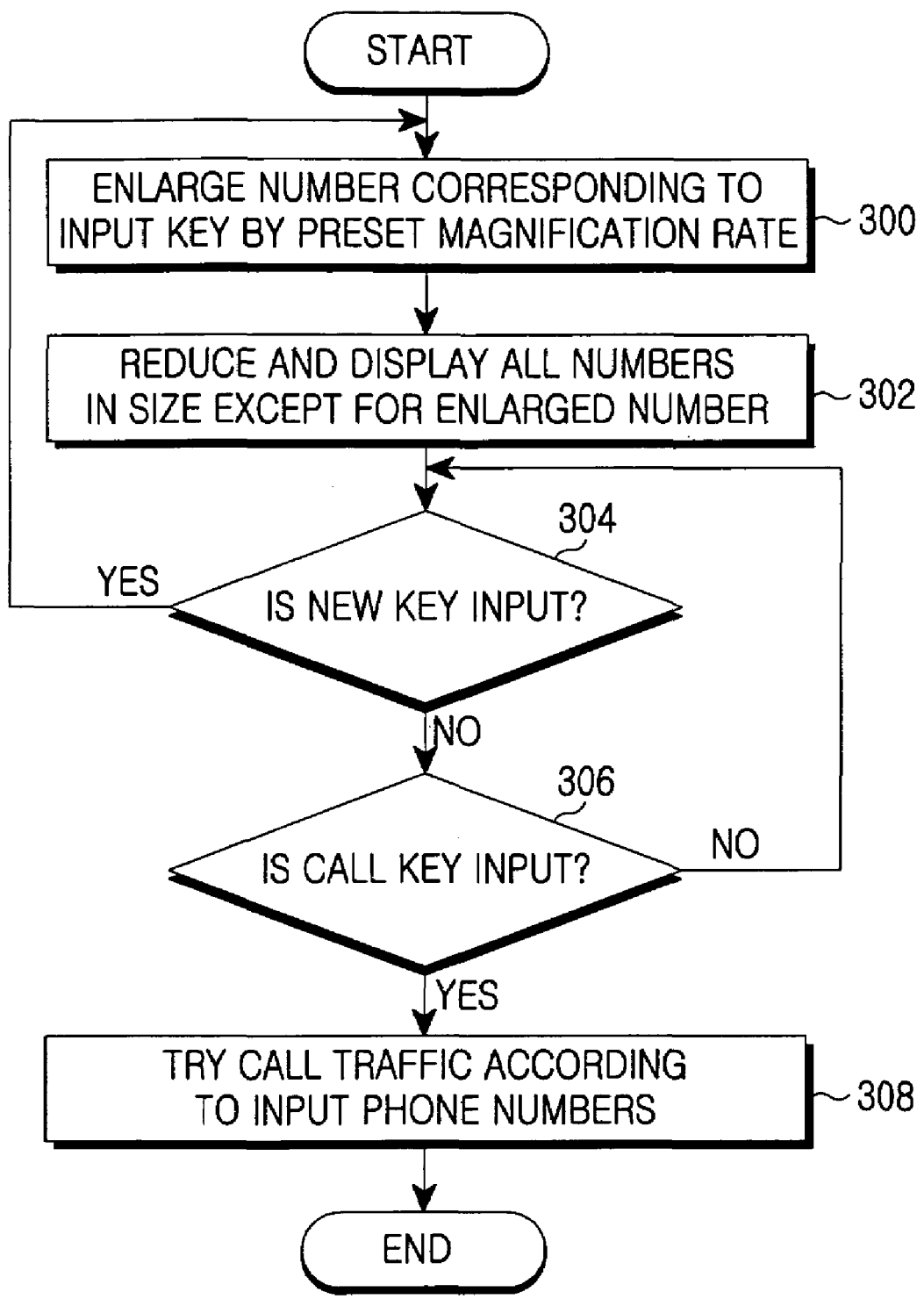
FIG. 3 illustrates a flow chart illustrating an operation process for displaying enlarged input numbers according to an embodiment of the present invention.

FIG. 3 illustrates a flow chart illustrating a process for displaying enlarged input according to an embodiment of the present invention. Referring to FIG. 3, when the user inputs a key number, in step 300, the controller 200 enlarges the number by a preset magnification rate. In step 302, the controller 200 reduces the size of any previously entered number, which has been input prior to the current number, into an original size such that the current key number is displayed in an enlarged size and all the previously entered numbers are displayed in an original size, i.e., reduced from an enlarged size, on the display unit 206.

In step 304, the controller 200 determines if a new key is input. If a new key is input, then the process returns to step 300, where the controller 200 enlarges the new key number by the preset magnification rate. Then, in step 302, the controller again reduces, into the original size, all the preceding key numbers except for the enlarged new key number, which has been input in step 304. In step 304, the controller then determines if any new key is input.

If a new key is not input in step 304, in step 306, the controller determines if the user inputs a call key. If the call key is input, in step 308, the controller attempts to perform the call. If the user does not input the call key in step 306, the process returns to step 304, wherein the controller again determines if the user inputs a new key. Accordingly, in the mobile communication terminal according to the present invention, only the currently input key is displayed in an enlarged size, of which magnification rate is preferably preset as described above.

Figure 4C:
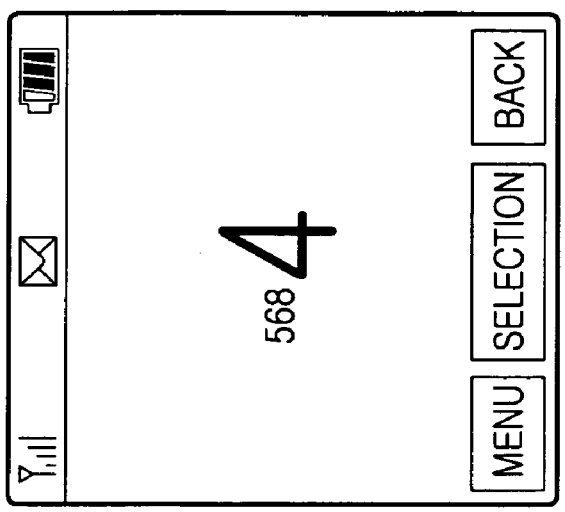
FIGS. 4A through 4C illustrate exemplary display screens of a mobile communication terminal according to a preferred embodiment of the present invention.
Figure 4B:
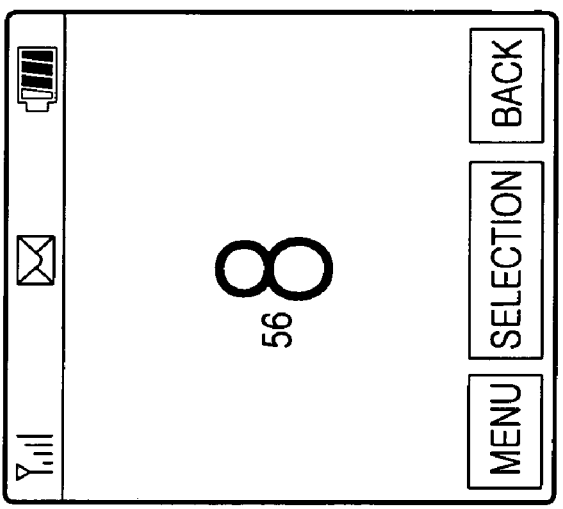
Figure 4A:
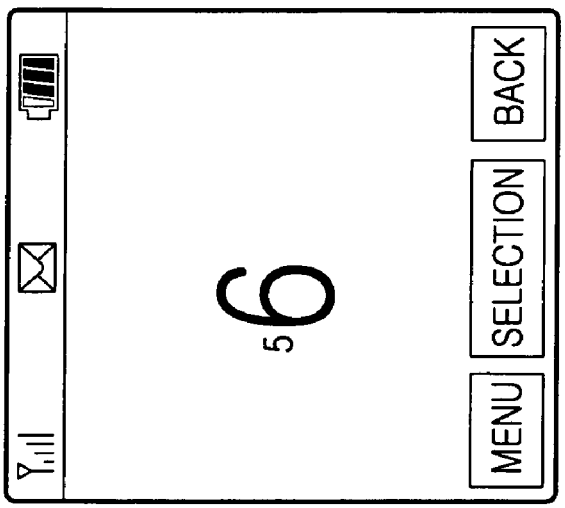

FIGS. 4A through 4C illustrates an exemplary numbers displayed on a display unit of a mobile communication terminal according to a preferred embodiment of the present invention. As illustrated in FIGS. 4A through 4C, whenever a key is newly input, only the new input key number (i.e., the current key number) is displayed on the display unit 206 in an enlarged size with the previously input numbers displayed in a reduced size (or the original size) of which reduction rate is preferably preset as described above.

Referring to FIGS. 4A through 4C, when the user inputs the number key '5', the controller 200 enlarges the input number '5' (the enlarged form is not shown) by the preset magnification rate to be displayed on the display unit. Then, the user inputs the number key '6', and the controller 200 enlarges the current input key number '6' by the preset magnification rate. The controller reduces, to the original size, the preceding key number '5', which has been input just prior to the current key number '6'. Therefore, only number '6' is shown in the enlarged form on the display unit.

Whenever the user inputs a new key, only the new input key (the current input key number) is displayed on the display unit in the enlarged form of the preset magnification rate, as illustrated in FIGS. 4B and 4C.

Additionally, although not shown, the present invention is also application to a character input method in which remaining characters of a character string that is previously stored are displayed after a first character of the character string is input. In this case, only the currently input character is displayed in an enlarged form and the remaining characters of the character string are displayed in an original size, i.e., smaller than the enlarged currently input character.

Accordingly, using the present invention, a user can easily and distinctly discern the current key number input from the remained numbers or key characters previously input. Further, because the remaining numbers or the preceding numbers are displayed in the reduced size (or the original small size), the displayed space or area of the display unit can be saved to make efficient use of the limited display area in the mobile communication terminal according to the present invention.

Although the description of the present invention is made based on the exemplary embodiments thereof, various changes in forms and details may be made within the scope of the present invention. For example, in the above embodiments, the last (i.e., current) input key number can be enlarged in size by the preset magnification rate on the display unit. However, the preset magnification rate may be changed by the user according to an embodiment of the present invention.

Further, as indicated above, according to an embodiment of the present invention, the user may input not only the number keys but also a character key such as '*' or '#' key in the mobile communication terminal. More specifically, in the above embodiments of the present invention, the exemplary displays of only the number keys are illustrated and described. However, for example, the input or use of a short messaging service (SMS) may be applied to the present invention. In this case, of course, the enlarged current key may include a word, not a part of the word.

For example in a word, 'boy', the currently enlarged key character may be not one of three spellings b,o,y, but all of three spelling (combined characters) 'boy'. More specifically, if the user inputs the first spelling 'b' of the word 'boy', then the display unit may display the current input key 'b' in the enlarged form thereon. Consequently, if the second spelling 'o' of the word 'boy' is input, then the display unit may display both 'b' and 'o' in the enlarged form thereon as a current input key. Next, if the user inputs the last spelling 'y', then the display unit may display all the three spelling 'boy' in the enlarged form thereon as a current input key. Therefore, the scope of the present invention should be defined based on not the above embodiments but the appended claims or an equivalent thereof.

What is claimed is:

1. An apparatus for providing an improved character input display in a mobile communication terminal, the apparatus comprising:
    a key input unit;
    a controller for enlarging a first character corresponding to a first input key to an enlarged size corresponding to a preset magnification rate, and enlarging a second character corresponding to a second input key to the enlarged size by the preset magnification rate, while reducing the first character to an original size, which is smaller than the enlarged size; and
    a display unit for displaying, on an area for displaying entered characters, the second character in the enlarged size with the first character in the original size,
    wherein the controller displays a string of all inputted characters on the display unit according to a user's input order, and only a lastly inputted character among the inputted characters is displayed in the enlarged size.

2. The apparatus as claimed in claim 1, wherein the character is a number corresponding to a number key input.

3. The apparatus as claimed in claim 1, wherein the controller enlarges both the first and the second characters in the enlarged size as a combination of characters, if the first and the second characters can be combined in a word.

4. A method for providing an improved character input display in a mobile communication terminal, the method comprising the steps of:
    enlarging a first character corresponding to a key input on a key input unit to an enlarged size according to a preset magnification rate;
    determining if a new key is input; and
    reducing the enlarged first character to an original size, which is smaller than the enlarged size, and enlarging a second character corresponding to the new key input to the enlarged size, if the new key is input; and
    displaying, on an area for displaying entered characters, the second character in the enlarged size with the first character in the original size,
    wherein a string of all inputted characters is displayed on the display area according to a user's input order, and only a lastly inputted character among the inputted characters is displayed in the enlarged size.

5. The method as claimed in claim 4, wherein the preset magnification rate can be set by a user.

* * * * *

UNITED STATES PATENT AND TRADEMARK OFFICE
CERTIFICATE OF CORRECTION

PATENT NO.      : 7,580,731 B2
APPLICATION NO. : 11/221128
DATED           : August 25, 2009
INVENTOR(S)     : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 785 days.

Signed and Sealed this

Fourteenth Day of September, 2010

David J. Kappos
*Director of the United States Patent and Trademark Office*